US010702834B2

United States Patent
Iwai et al.

(10) Patent No.: US 10,702,834 B2
(45) Date of Patent: Jul. 7, 2020

(54) SEPARATION MEMBRANE AND METHOD FOR PRODUCING SAME

(71) Applicant: TORAY INDUSTRIES, INC., Tokyo (JP)

(72) Inventors: Kenta Iwai, Shiga (JP); Toshiyuki Ishizaki, Shiga (JP); Tamotsu Kitade, Shiga (JP); Kenji Komori, Shiga (JP); Masayuki Hanakawa, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 561 days.

(21) Appl. No.: 15/324,399

(22) PCT Filed: Jul. 7, 2015

(86) PCT No.: PCT/JP2015/069547
§ 371 (c)(1),
(2) Date: Jan. 6, 2017

(87) PCT Pub. No.: WO2016/006611
PCT Pub. Date: Jan. 14, 2016

(65) Prior Publication Data
US 2017/0157572 A1  Jun. 8, 2017

(30) Foreign Application Priority Data
Jul. 7, 2014 (JP) .................. 2014-139397

(51) Int. Cl.
*B01D 71/34* (2006.01)
*D01D 5/24* (2006.01)
(Continued)

(52) U.S. Cl.
CPC .......... *B01D 71/34* (2013.01); *B01D 61/14* (2013.01); *B01D 67/0013* (2013.01);
(Continued)

(58) Field of Classification Search
None
See application file for complete search history.

(56) References Cited

U.S. PATENT DOCUMENTS

| 4,399,035 A | 8/1983 | Nohmi et al. |
| 4,933,081 A | 6/1990 | Sasaki et al. |

(Continued)

FOREIGN PATENT DOCUMENTS

| CN | 1481272 A | 3/2004 |
| EP | 1 284 811 B1 | 7/2006 |

(Continued)

OTHER PUBLICATIONS

Chinese Office Action and Search Report, dated Sep. 21, 2018, for Chinese Application No. 201580037042.5, along with an English translation.

(Continued)

*Primary Examiner* — Krishnan S Menon
(74) *Attorney, Agent, or Firm* — Birch, Stewart, Kolasch & Birch, LLP

(57) ABSTRACT

An object of the present invention is to provide a separation membrane having high mechanical strength and being less likely to cause clogging and capable of continuously maintaining high water permeation performance. The present invention relates to a separation membrane characterized in that the average diameter D1 of a spherical structure in a region within 10 μm from a first surface in a separation membrane having a spherical structure layer formed of a thermoplastic resin and the average diameter D2 of a spherical structure in a region of 10 μm to 20 μm from a second surface satisfy the relational expression of D1>D2 and the average diameter D1 and the average diameter D3 of a spherical structure in a third region satisfy the relational expression of 1.10<D1/D3<4.00.

6 Claims, 4 Drawing Sheets

(51) Int. Cl.
  *D01F 6/12* (2006.01)
  *C08J 5/18* (2006.01)
  *B01D 69/08* (2006.01)
  *B01D 69/02* (2006.01)
  *B01D 69/06* (2006.01)
  *B01D 61/14* (2006.01)
  *B01D 67/00* (2006.01)

(52) U.S. Cl.
  CPC ............ *B01D 69/02* (2013.01); *B01D 69/06* (2013.01); *B01D 69/08* (2013.01); *B01D 69/085* (2013.01); *C08J 5/18* (2013.01); *D01D 5/24* (2013.01); *D01F 6/12* (2013.01); *B01D 2325/02* (2013.01); *C08J 2327/16* (2013.01)

(56) References Cited

U.S. PATENT DOCUMENTS

| | | | |
|---|---|---|---|
| 5,022,990 | A | 6/1991 | Doi et al. |
| 7,182,870 | B2 | 2/2007 | Minegishi et al. |
| 7,504,034 | B2 | 3/2009 | Minegishi et al. |
| 2003/0094409 | A1 | 5/2003 | Minegishi et al. |
| 2004/0135274 | A1* | 7/2004 | Matsuda ............ B01D 67/0011 264/28 |
| 2005/0247621 | A1 | 11/2005 | Kools |
| 2005/0258101 | A1 | 11/2005 | Minegishi et al. |
| 2007/0090051 | A1 | 4/2007 | Minegishi et al. |
| 2009/0178969 | A1* | 7/2009 | Hanakawa ......... B01D 67/0006 210/321.6 |
| 2013/0134081 | A1* | 5/2013 | Kang .................. B01D 67/003 210/196 |
| 2015/0246326 | A1* | 9/2015 | David ................... B01D 69/12 210/650 |

FOREIGN PATENT DOCUMENTS

| | | | |
|---|---|---|---|
| JP | 62-27006 A | 2/1987 | |
| JP | 1-22003 B2 | 4/1989 | |
| JP | 2899903 B2 | 6/1999 | |
| JP | 2004-501236 A | 1/2004 | |
| JP | 2006-281202 A | 10/2006 | |
| JP | 2008-173573 A | 7/2008 | |
| KR | 2007113374 A * | 11/2007 | ............. B01D 71/34 |
| WO | WO 01/89672 A1 | 11/2001 | |
| WO | WO 03/031038 A1 | 4/2003 | |

OTHER PUBLICATIONS

Japanese Office Action, dated Mar. 26, 2019, for Japanese Application No. 2015-535905, along with an English translation.
International Search Report for PCT/JP2015/069547 (PCT/ISA/210) dated Oct. 6, 2015.
Written Opinion of the International Searching Authority for PCT/JP2015/069547 (PCT/ISA/237) dated Oct. 6, 2015.

* cited by examiner

SEPARATION MEMBRANE AND METHOD FOR PRODUCING SAME

TECHNICAL FIELD

The present invention relates to a method for producing a microfiltration or ultrafiltration membrane used for a water treatment such as wastewater treatment, water purifying treatment and industrial water production, and a separation membrane produced by the production method.

BACKGROUND ART

A separation membrane such as microfiltration membrane and ultrafiltration membrane is utilized in various fields including food industry, medical treatment, city water production, wastewater treatment and other fields. In particular, a separation membrane is recently used also in the field of drinking water production, i.e., in the water purification. As to the separation membrane used for a water treatment such as drinking water production, the amount of water that must be treated is large, and excellent water permeation performance is therefore required.

Furthermore, the separation membrane is preferably resistant to clogging, i.e., capable of continuously maintaining high water permeation performance. By using a membrane having excellent water permeation performance, the same desalination amount can be realized with a smaller membrane area, so that the water treatment apparatus can be made compact and consequently, the equipment cost can be saved. In addition, the water treatment apparatus equipped with a membrane resistant to clogging can be operated at a low cleaning frequency with a low power consumption and therefore, is advantageous from the viewpoint of operating cost as well.

The separation membrane is sometimes put into contact with a sterilizer such as sodium hypochlorite used for sterilizing permeate or preventing biofouling of the separation membrane. Furthermore, the separation membrane is sometimes washed with an acid, an alkali, chlorine, a surfactant, etc. Accordingly, the separation membrane preferably has chemical resistance.

In recent years, there is an emerging problem that pathogenic microorganisms resistant to chlorine (for example, *cryptosporidium* derived from livestock excreta, etc.) get mixed in with clean water due to damage to the separation membrane.

That is, the separation membrane is required to have sufficient separation properties and high strength and elongation.

As to the conventional production method for a separation membrane, for example, Patent Document 1 discloses a wet solution method where a polymer solution prepared by dissolving a polyvinylidene fluoride-based resin as a thermoplastic resin in a good solvent is molded at a temperature fairly lower than the melting point of the polyvinylidene fluoride-based resin and then brought into contact with a liquid containing a nonsolvent for the polyvinylidene fluoride-based resin to cause nonsolvent-induced phase separation to thereby form an asymmetric porous structure.

In more recent times, as disclosed in Patent Document 2, there is a melt-extraction method where a polyvinylidene fluoride-based resin as a thermoplastic resin is melted and kneaded with an inorganic particle and an organic liquid, the mixture is extruded and solidified at a temperature not less than the melting point of the polyvinylidene fluoride-based resin, and the organic liquid and the inorganic particle are then extracted to form a porous structure.

Patent Document 3 discloses a method where a polyvinylidene fluoride-based resin solution containing a polyvinylidene fluoride-based resin as a thermoplastic resin and a poor solvent for the resin and having a temperature not less than the phase separation temperature is solidified in a cooling bath at a temperature not more than the phase separation temperature to cause thermally induced phase separation to thereby obtain a separation membrane having a spherical structure of 0.3 µm to 30 µm and having relatively high strength/elongation.

BACKGROUND ART DOCUMENT

Patent Document

Patent Document 1: JP-B-1-22003 (the term "JP-B" as used herein means an "examined Japanese patent publication")
Patent Document 2: Japanese Patent No. 2899903
Patent Document 3: WO 03/031038

SUMMARY OF THE INVENTION

Problems that the Invention is to Solve

In the wet solution method of Patent Document 1, it is difficult to uniformly cause phase separation in the membrane thickness direction, and a membrane having an asymmetric three-dimensional network structure containing macro-voids is therefore formed. The mechanical strength of such a membrane is insufficient. In addition, this production method includes many factors affecting the structure and performance of the membrane and is disadvantageous in that the membrane production conditions are difficult to control and the reproducibility is poor.

According to the melt-extraction method of Patent Document 2, the vacancy characteristics can be easily controlled, and macro-voids are less likely formed, making it possible to obtain a membrane having a relatively homogenous three-dimensional network structure. However, the breaking strength of such a membrane is insufficient, though the elongation at break is high, and if the dispersibility of inorganic particles is poor, a pin hole (i.e., a defect) may be produced. Furthermore, the melt-extraction method is disadvantageous in that the production cost thereof is significantly high.

In the method of Patent Document 3 utilizing thermally induced phase separation, it is difficult for the obtained membrane to satisfy both the water permeation performance and the strength/elongation.

Considering these problems, an object of the present invention is to provide a separation membrane including a spherical structure layer formed of a thermoplastic resin, having high mechanical strength, and being less likely to cause clogging and capable of continuously maintaining high water permeation performance, and a production method for the separation membrane.

Means for Solving the Problems

Namely, the present invention relates to the following [1] to [9].
[1] A separation membrane having a spherical structure layer formed of a thermoplastic resin,
in which the spherical structure layer has a first surface and a second surface, in the spherical structure layer, an average diameter D1 of a spherical structure S1 in a region within 10 μm from the first surface and an average diameter D2 of a spherical structure S2 in a region of 10 μm to 20 μm from the second surface satisfy a relational expression of D1>D2, and the average diameter D1 and an average diameter D3 of a spherical structure S3 in a region of 10 μm to 20 μm from the first surface satisfy a relational expression of 1.10<D1/D3<4.00.

[2] The separation membrane according to [1], in which the average diameter D1 and the average diameter D3 satisfy a relational expression of 0.00 μm<(D1−D3)<2.00 μm.

[3] The separation membrane according to [1] or [2], in which the average diameter D1 is from 2.00 μm to 4.00 μm, and the average diameter D3 is 0.10 μm or more and less than 2.00 μm.

[4] The separation membrane according to any one of [1] to [3], in which the average diameter D3 and the average diameter D2 satisfy a relational expression of −0.30 μm<(D3−D2)<0.30 μm.

[5] The separation membrane according to any one of [1] to [4], in which the thermoplastic resin is a polyvinylidene fluoride-based resin.

[6] A method for producing a separation membrane, the method including:

(a) a step of dissolving a polyvinylidene fluoride-based resin in a poor solvent to obtain a polyvinylidene fluoride-based resin solution;

(b) a step of holding the polyvinylidene fluoride-based resin solution under conditions allowing primary nucleus formation to proceed;

(c) a step of molding the polyvinylidene fluoride-based resin solution into a separation membrane shape;

(d) a step of solidifying the polyvinylidene fluoride-based resin solution by solid-liquid thermally induced phase separation in a cooling bath; and (e) a step of imparting a temperature gradient in a separation membrane thickness direction to the polyvinylidene fluoride-based resin solution, between start of the step (c) and start of the step (d).

[7] The method for producing a separation membrane according to [6], in which a solution temperature T1° C. at a time of the dissolution in the step (a) is a temperature not less than a crystallization temperature Tc° C., and the conditions allowing the primary nucleus formation to proceed in the step (b) are a pressure of 0.5 MPa or more and a temperature of (Tc+20)° C. to (Tc+55)° C.

[8] The method for producing a separation membrane according to [7], in which a time for holding under the conditions allowing the primary nucleus formation to proceed in the step (b) is 10 seconds or more.

[9] The method for producing a separation membrane according to any one of [6] to [8], in which, in the step (e), an average temperature rise rate at a time of imparting the temperature gradient is from 30 to 700° C./min, and an imparting time thereof is from 0.1 to 5.0 seconds.

Advantage of the Invention

According to the present invention, a separation membrane having high mechanical strength and being less likely to cause clogging and capable of continuously maintaining high water permeation performance is provided.

MODE FOR CARRYING OUT THE INVENTION

Figure 1:
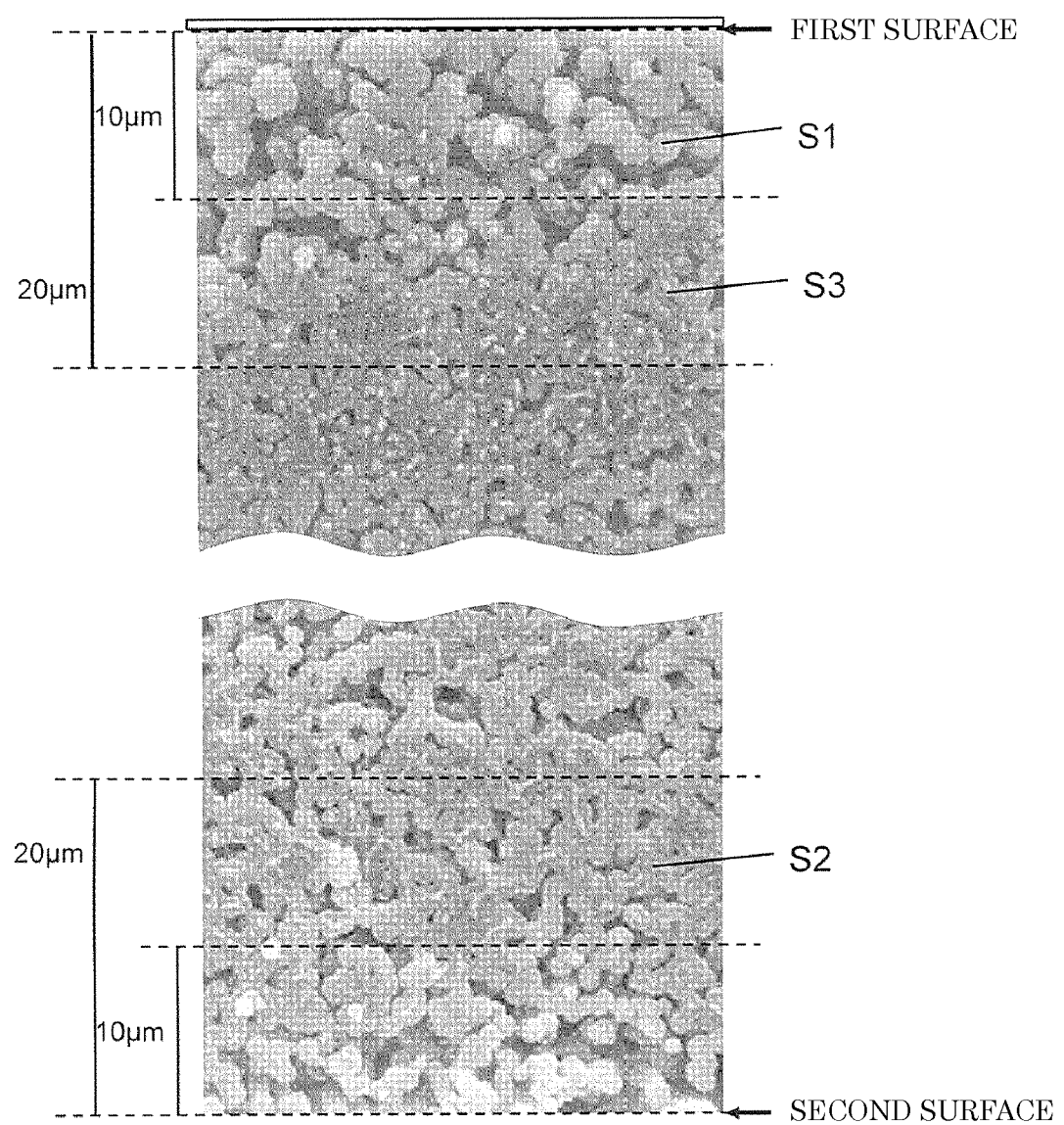
FIG. 1 is an electron micrograph of the vicinities of a first surface and a second surface out of a cross-section perpendicular to the surface direction of the separation membrane according to Example 5.

The separation membrane of the present invention has a spherical structure layer formed of a thermoplastic resin. The spherical structure layer has a first surface and a second surface, and in a cross-section of the spherical structure layer parallel to the separation membrane thickness direction, the average diameter D1 of a spherical structure S1 in a region within 10 μm from the first surface and the average diameter D2 of a spherical structure S2 in a region of 10 μm to 20 μm from the second surface satisfy the relational expression of D1>D2, and the average diameter D1 and the average diameter D3 of a spherical structure S3 in a region of 10 μm to 20 μm from the first surface satisfy the relational expression of 1.10<D1/D3<4.00.

In the present invention, each of the first surface and the second surface of the spherical structure layer may be either a surface or an interface.

In the case of a single-layer separation membrane where the separation membrane has only a spherical structure layer, the spherical structure has a first surface and a second surface, and these surfaces are respectively the first surface and the second surface of the separation membrane. The separation membrane is usually used by arranging the first surface to come into contact with liquid to be treated.

In the case where the separation membrane is a composite separation membrane having a spherical structure layer and another layer, the another layer is stacked on at least either one of the first surface and the second surface in the spherical structure layer. In the present description, the surface put into contact with another layer is referred to as "interface". In the case where the separation membrane has an interface between the spherical structure layer and another layer, the interface closer to liquid to be treated is referred to as a first interface, and the interface on the opposite side is referred to a second interface.

Here, the boundary (interface) between another structure layer and the spherical structure layer can be judged by using an electron micrograph of a cross-section perpendicular to the separation membrane surface (i.e., a cross-section parallel to the separation membrane thickness direction). Specifically, a cross-section perpendicular to the separation membrane surface is observed from the liquid-to-be-treated side to the permeation side by means of an electron microscope, and a surface where a layer composed of only a spherical structure first appears is defined as an interface.

By virtue of having a first surface or interface of such a structure on the liquid-to-be-treated side, the separation membrane continuously maintains high water permeation performance and has high strength/elongation. As the spherical structure S1 is more microminiaturized, the opportunity for spheres to be joined with each other is increased, leading to high strength/elongation, but on the other hand, the microminiaturization decreases the pore size and thus decreases the water permeation performance.

If the pore size of a spherical structure in the surface on the liquid-to-be-treated side of the separation membrane is small, clogging readily occurs at the time of filtration of a liquid containing suspended matter and the filtration resistance is therefore increased to gradually reduce the water permeation performance. If the pore size of a spherical structure in the interface on the liquid-to-be-treated side of the separation membrane is small, the filtration resistance of the interface increases and in turn, the initial water permeation performance decreases.

More specifically, in order for the separation membrane to maintain low filtration resistance and continuously achieve high water permeation performance, the structure in the surface or interface of the separation membrane on the side coming into contact with liquid to be treated is important, and in order to achieve high strength/elongation, the structure of an internal layer of the separation membrane is important. In the separation membrane of the present invention, a spherical structure diameter (average diameter $D1$) in the vicinity of a surface layer of the separation membrane or of an interface with another layer in the spherical structure layer is set to be relatively large, whereby a separation membrane maintaining high water permeation performance with low filtration resistance and having high strength/elongation can be realized.

The thermoplastic resin constituting the separation membrane indicates a resin that is made of a chain polymer substance and when heated, exhibits a property of being deformed or fluidized by an external force.

Examples of the thermoplastic resin include polyethylene, polypropylene, acrylic resin, polyacrylonitrile, acrylonitrile-butadiene-styrene (ABS) resin, polystyrene, acrylonitrile-styrene (AS) resin, vinyl chloride resin, polyethylene terephthalate, polyamide, polyacetal, polycarbonate, modified polyphenylene ether, polyphenylene sulfide, polyvinylidene fluoride, polyamide-imide, polyetherimide, polysulfone, polyether sulfone, and a mixture or copolymer thereof.

The thermoplastic resin for use in the present invention is preferably a polyvinylidene fluoride-based resin having high chemical resistance.

Here, the polyvinylidene fluoride-based resin means a resin containing a vinylidene fluoride homopolymer and/or a vinylidene fluoride copolymer and may contain a plurality of kinds of vinylidene fluoride copolymers.

The vinylidene fluoride copolymer is a polymer having a vinylidene fluoride residue structure and is typically a copolymer of a vinylidene fluoride monomer and a fluorine-based monomer other than that. Such a copolymer includes, for example, a copolymer of a vinylidene fluoride and one or more kinds of monomers selected from vinyl fluoride, ethylene tetrafluoride, propylene hexafluoride, and chlorotrifluoroethylene. In addition, a monomer such as ethylene may be copolymerized as a monomer other than the fluorine-based monomer to an extent of not impairing the effects of the present invention.

In addition to the thermoplastic resin, the separation membrane may contain a resin miscible with the thermoplastic resin, a polyhydric alcohol or a surfactant in a ratio of 50 mass % or less.

In the present description, the "spherical structure" means a structure of a solid part that is substantially a circle in its cross-section perpendicular to the separation membrane surface (i.e., parallel to the separation membrane thickness direction). The substantially circle encompasses a perfect circle and an ellipse. Respective solid parts are joined by sharing a part thereof with each other in the plane or thickness direction of the separation membrane.

The "spherical structure" is also used as a word indicating individual solid parts but for the sake of convenience, sometimes indicates the entire structure constituted by solid parts joined with each other. The separation membrane exhibits high strength/elongation by having a spherical structure layer and exhibits high water permeation performance by containing a large void.

In the separation membrane of the present invention, the average diameter $D1$ of a spherical structure S1 and the average diameter $D2$ of a spherical structure S2 satisfy the relational expression of $D1>D2$, and the ratio $D1/D3$ of the average diameter $D1$ and the average diameter $D3$ of a spherical structure S3 satisfies the relational expression of $1.10<D1/D3<4.00$. In the spherical structure layer, the spherical structure in a region within 10 μm from the first surface is designated as S1, the spherical structure in a region of 10 μm to 20 μm from the second surface is designated as S2, and the spherical structure in a region of 10 μm to 20 μm from the first surface is designated as S3.

More specifically, as a result of many intensive studies, the present inventors have found that when $D1>D2$ and $1.10<D1/D3<4.00$ are established, a separation membrane having low filtration resistance, thereby maintaining high water permeation performance, and having high strength/elongation can be formed.

When $D1/D3$ is more than 1.10, the filtration resistance is low, and high permeation performance is maintained. In addition, when $D1/D3$ is less than 4.00, both water permeation performance and strength/elongation are satisfied. The average diameter relationship $D1/D3$ of spherical structures is preferably $1.15<D1/D3<3.50$, more preferably $1.20<D1/D3<3.00$.

Here, the upper limit and the lower limit in various numerical value ranges recited in the present description can be arbitrarily combined.

When the average diameter $D1$ of a spherical structure S1 in a region within 10 μm from the first surface of the separation membrane and the average diameter $D3$ of a spherical structure S3 in a region of 10 μm to 20 μm from the first surface (hereinafter, sometimes simply referred to as "internal layer") of the separation membrane are adjusted to satisfy the relationship of $1.10<D1/D3<4.00$, the filtration resistance can be reduced, because the structure of the membrane surface or interface layer becomes relatively coarse to offer a so-called depth filtration mechanism for blocking suspended matter not by the surface but by the entire layer. According to the depth filtration mechanism, the suspended matter can be dispersed in the separation membrane, compared with a separation membrane of surface blocking type, so that a rise in the filtration resistance can be suppressed.

The present invention provides a separation membrane having a spherical structure capable of achieving both high water permeation performance and high strength/elongation, in which the structure of a spherical structure layer on the liquid-to-be-treated side is made to be a depth filtration mechanism for hardly causing clogging and ensuring low filtration resistance and a separation membrane continuously maintaining high water permeation performance and having high strength/elongation is thereby realized.

In the separation membrane of the present invention, the relationship of the average diameters D1 and D3 of the spherical structure S1 and the spherical structure S3 is preferably 0.00 µm<(D1−D3)<2.00 µm. When (D1−D3) is more than 0.00 µm, clogging is less likely to occur, and high permeation performance can be maintained. When (D1−D3) is less than 2.00 µm, the difference in filtration resistance between the surface layer and the internal layer of the spherical structure layer can be kept relatively low and good liquid filterability can therefore be maintained. In addition, when (D1−D3) is less than 2.00 µm, the number of joined portions between the spherical structure S1 and the spherical structure S3 is relatively increased, as a result, good strength/elongation is realized.

The average diameter difference (D1−D3) of spherical structures in the separation membrane of the present invention preferably satisfies 0.10 µm<(D1−D3)<1.70 µm, more preferably 0.20 µm<(D1−D3)<1.40 µm.

The average diameter D1 of the spherical structure S1 in the first surface may be of a size which hardly allows clogging and enables maintaining the water permeation performance, and the diameter is not limited to a specific numerical value. However, the average diameter D1 is preferably from 2.00 µm to 4.00 µm, more preferably from 2.10 µm to 3.50 µm, still more preferably from 2.20 µm to 3.00 µm.

The average diameter D2 of the spherical structure S2 in the second surface is not limited to a specific numerical value as long as the relationship of D1>D2 is satisfied.

The average diameter D3 of the spherical structure S3 in the internal layer is not particularly limited as long as the target strength/elongation of the separation membrane can be achieved. However, the average diameter D3 is preferably from 0.10 µm to 2.00 µm, more preferably from 0.30 µM to 1.90 µm, still more preferably from 0.60 µm to 1.80 µm.

In the separation membrane of the present invention, the average diameter D3 of a spherical structure S3 in a region of 10 µM to 20 µM from the first surface and the average diameter D2 of a spherical structure S2 in a region of 10 µm to 20 µm from the second surface preferably satisfy the relationship of −0.30 µm<(D3−D2)<0.30 µm.

More specifically, out of the entire separation membrane, the spherical structure diameter in a surface layer portion as a region within 10 µm from the surface on the liquid-to-be-treated side is set to be relatively larger than the spherical structure diameter in other portions of the separation membrane, whereby the effects of the present invention are achieved and a separation membrane satisfying both high water permeation performance and high strength/elongation in a balanced manner is obtained.

The average diameter difference (D3−D2) of spherical structures in the separation membrane of the present invention preferably satisfies −0.2 µm<(D3−D2)<0.2 µm, more preferably −0.1 µm<(D3−D2)<0.1 µm. In the present invention, the second surface of the separation membrane is usually on the permeated liquid side when used as a liquid separation membrane.

The average diameter D1 of a spherical structure S1, the average diameter D2 of a spherical structure S2, and the average diameter D3 of a spherical structure S3 in the spherical structure layer of the separation membrane are determined using an electron micrograph of a cross-section perpendicular to the separation membrane surface.

D1 is calculated from spherical structure diameters in a region within 10 µm in the thickness direction from the first surface on an electron micrograph of a cross-section perpendicular to the separation membrane surface. D2 is calculated from spherical structure diameters in a region between a portion 10 µm deep and a portion 20 µm deep in the thickness direction from the second surface on an electron micrograph of a cross-section perpendicular to the separation membrane surface. D3 is calculated from spherical structure diameters in a region between a portion 10 µm deep and a portion 20 µm deep in the thickness direction from the first surface on an electron micrograph of a cross-section perpendicular to the separation membrane surface.

At the time of calculation of the average diameters of spherical structures, as to an unjoined spherical structure (a spherical structure of which contoured part can be recognized), a straight line is drawn in its major axis direction, and the size thereof is defined as the diameter.

Figure 4:
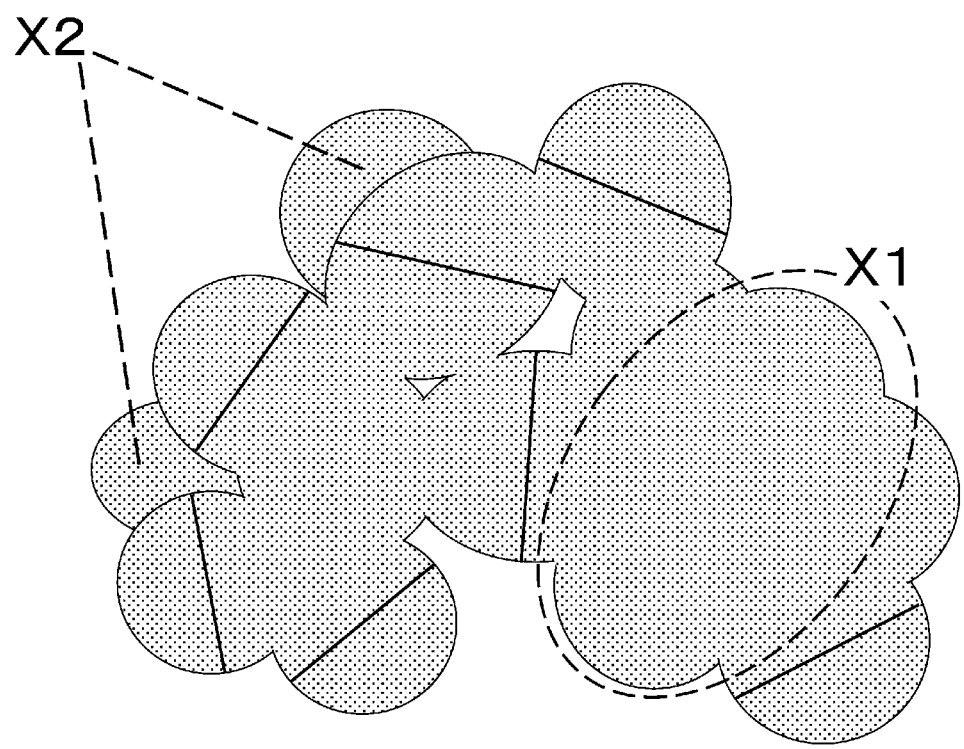
FIG. 4 is an explanatory view depicting a method for calculating the average diameter of a spherical structure.

In the case where spherical structures are joined, as illustrated in FIG. 4, a straight line is drawn in the major axis direction of a spherical structure not to include the joined portion of spherical structures with each other, and the size thereof is defined as the diameter. At this time, the contoured parts of spherical structures, coming into contact with the straight line drawn in the major axis direction, are assumed to oppose each other substantially in parallel, and structures with their contoured parts not opposing each other substantially in parallel (corresponding to symbol X1 in FIG. 4) are not measured.

In the case where two structures appear to overlap in the front-to-back direction of the electron micrograph, the spherical structure diameter of a texture on the back side (corresponding to symbol X2 in FIG. 4) is not measured, and only the spherical structure diameter on the front side is measured by taking the contour of the texture on the front side as a boundary line of those two textures.

In the case where the texture is discontinued at an end of the electron micrograph used for determination, the spherical structure diameter of the texture at the end is not measured. The average diameters D1, D2 and D3 can be determined by measuring diameters of all spherical structures present in each arbitrary region of 10 µm in thickness direction×100 µm in width direction and calculating the arithmetic average of the measured values.

The thickness of the entire separation membrane of the present invention is, taking into account the water permeation performance and strength/elongation, preferably from 30 µm to 1,000 µm, more preferably from 40 µm to 500 µm, still more preferably from 50 µm to 350 µm.

When the thickness of the entire separation membrane is 30 µm, the region of 10 µm to 20 µm from the second surface coincides with the region of 10 µm to 20 µm from the first layer. When the thickness of the entire separation membrane is more than 30 µm and 40 µm or less, the region of 10 µm to 20 µm from the second surface overlaps in part with the region of 10 µm to 20 µm from the first surface.

[Production Method]

The separation membrane of the present invention can be specifically produced by a method including the following steps (a) to (e):

(a) a step of dissolving a polyvinylidene fluoride-based resin in a poor solvent to obtain a polyvinylidene fluoride-based resin solution;

(b) a step of holding the polyvinylidene fluoride-based resin solution under the conditions allowing primary nucleus formation to proceed;

(c) a step of molding the polyvinylidene fluoride-based resin solution in a separation membrane shape;

(d) a step of solidifying the polyvinylidene fluoride-based resin solution by solid-liquid thermally induced phase separation in a cooling bath; and (e) a step of imparting a temperature gradient in the separation membrane thickness direction to the polyvinylidene fluoride-based resin solution, between start of the step (c) and start of the step (d).

In the step (a), a poor solvent is used for inducing solid-liquid thermally induced phase separation in the later step (d). The solvent for inducing solid-liquid thermally induced phase separation includes, in particular, medium-chain-length alkyl ketone, ester, organic carbonate, etc., such as cyclohexanone, isophorone, γ-butyrolactone, methyl isoamyl ketone, dimethylsulfoxide and propylene carbonate, and a mixed solvent thereof.

As the resin concentration in the resin solution is higher, a primary nucleus is more readily formed and in turn, the average diameter of a spherical structure decreases, as a result, a separation membrane having high strength/elongation is obtained. However, as the resin concentration in the resin solution is lower, the void ratio of the produced separation membrane increases, and high water permeation performance is obtained.

From these viewpoints, in order to satisfy both water permeation and strength/elongation, the resin concentration in the resin solution is preferably from 30 to 60 wt %.

The temperature $T1°$ C. at the time of dissolution in the step (a) is preferably not less than the crystallization temperature $Tc°$ C.

The crystallization temperature Tc can be measured using a differential scanning calorimetric measurement (DSC measurement) device. The crystallization temperature Tc is a crystallization peak rising temperature observed in the process of lowering the temperature at a temperature drop rate of 10° C./min after a mixture having the same composition as the resin solution used for membrane production is sealed in a closed DSC container and uniformly dissolved by raising the temperature to a dissolution temperature at a temperature rise rate of 10° C./min and holding it for 30 minutes.

Specifically, the temperature $T1°$ C. is preferably (Tc+20)° C. or more, more preferably (Tc+30)° C. or more, and is preferably (Tc+100)° C. or less, more preferably (Tc+90)° C. or less. More specifically, the temperature $T1°$ C. is preferably 100° C. or more, more preferably 110° C. or more, and preferably 200° C. or less, more preferably 190° C. or less.

In order to homogenously form spherical structures by solid-liquid thermally induced separation, it is preferred that the polyvinylidene fluoride-based resin solution has been uniformly dissolved, and for this reason, the dissolution time is preferably 2 hours or more, more preferably 4 hours or more.

The resin solution may contain other additives.

The step (b) is a step of holding the polyvinylidene fluoride-based resin solution under the conditions allowing primary nucleus formation to proceed. From the X-ray diffraction results, etc., the process of forming a spherical structure is thought to be a crystal production process. In general, a crystal produced first at the time of crystallization of a crystalline polymer such as polyvinylidene fluoride-based resin is referred to as a primary nucleus. This primary nucleus grows into one spherical structure.

Growth of a spherical structure continues until spherical structures collide with each other and since the growth is stopped by collision, the particle diameter of the final spherical structure depends on the number of primary nuclei produced first. More specifically, it is considered that a large number of primary nuclei are preferably formed so as to obtain a small microspherical structure and a small number of primary nuclei are preferably formed so as to obtain a large macrospherical structure.

That is, control of the progress of primary nucleus formation is effective in controlling the spherical structure.

The process of primary nucleus formation of the resin solution can be controlled by temperature, pressure and/or time.

The temperature is, specifically, preferably not less than the temperature of the cooling bath of the step (d), more preferably not less than the crystallization temperature $Tc°$ C., still more preferably (Tc+20)° C. or more, and is preferably not more than the temperature $T1°$ C. at the dissolution of resin, more preferably (Tc+55)° C. or less.

As for the pressure, the resin solution is preferably pressurized to 0.5 MPa or more, more preferably pressurized to 0.8 MPa or more. When the resin solution is caused to stay under this pressure, primary nucleus formation at the temperature above stably proceeds. The upper limit of the pressure is preferably 3.0 MPa.

The time for holding under the conditions allowing primary nucleus formation to proceed is preferably 10 seconds or more, more preferably 20 seconds or more.

Formation of primary crystal nuclei in the thermally induced phase separation gradually proceeds in a region from not more than the melting temperature to not less than the crystallization temperature Tc (in the present description, referred to as "semi-stable region"), but by placing the resin solution under the conditions above, the number of primary nuclei formed can be relatively stably controlled.

The step (c) is specifically a step of molding the resin solution obtained in the step (a) by ejecting it from a spinneret for molding, having a slit or a tubular shape. Examples of the shape of the spinneret are illustrated in FIGS. 2(A), 2(B) and 2(C) and FIG. 3.

Figure 2A:
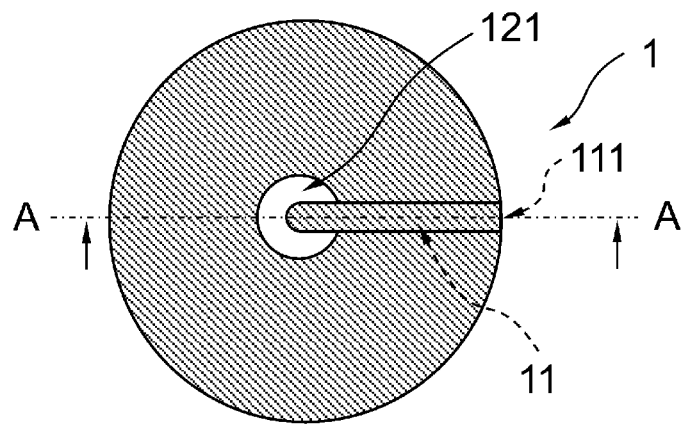
FIG. 2(A) is a top plan view illustrating a specific example of the configuration of a spinneret used for the production of a hollow fiber membrane.
Figure 2B:
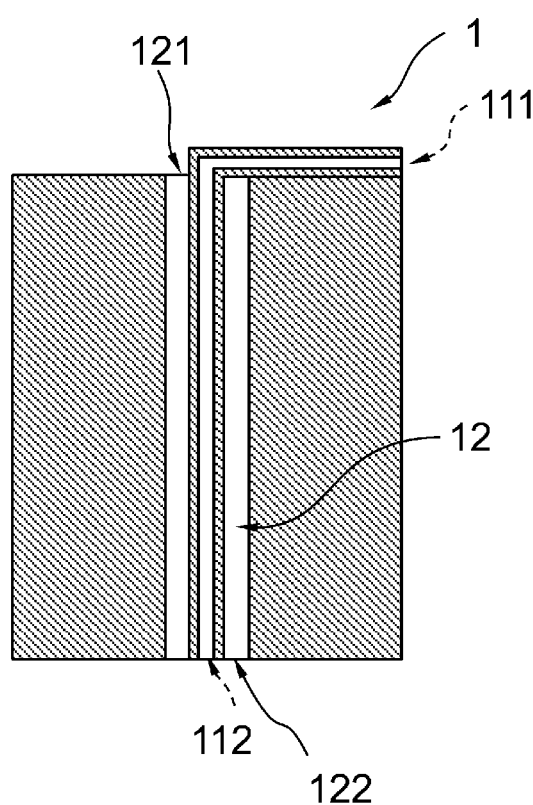
FIG. 2(B) is an A-A cross-sectional view of the spinneret illustrated in FIG. 2(A)
Figure 2C:
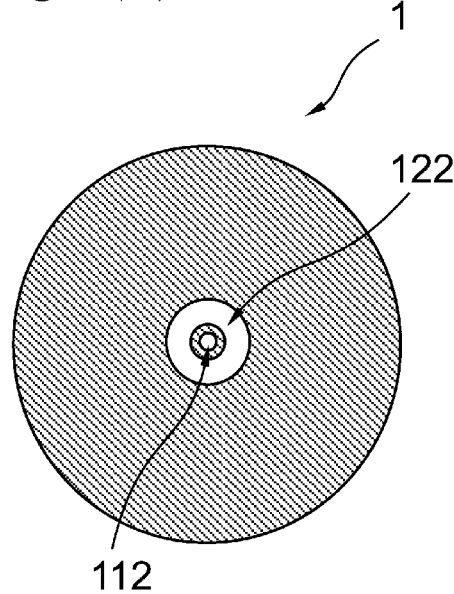
FIG. 2(C) is a bottom plan view of the spinneret illustrated in FIG. 2(A).

As illustrated in FIGS. 2(A), 2(B) and 2(C), the spinneret 1 for production of a hollow fiber membrane includes an inner nozzle 11 and an annular nozzle 12 provided outside the inner nozzle 11 to surround the inner nozzle. The inner nozzle 11 has an inner nozzle inlet 111 and an inner nozzle outlet 112, and the annular nozzle 12 has an annular nozzle inlet 121 and an annular nozzle outlet 122. A resin solution is ejected from the annular nozzle as an outer tube and at the same time, a fluid for forming a hollow part is ejected from the nozzle as an inner tube, whereby the resin solution is molded (processed) into a hollow shape.

Figure 3:
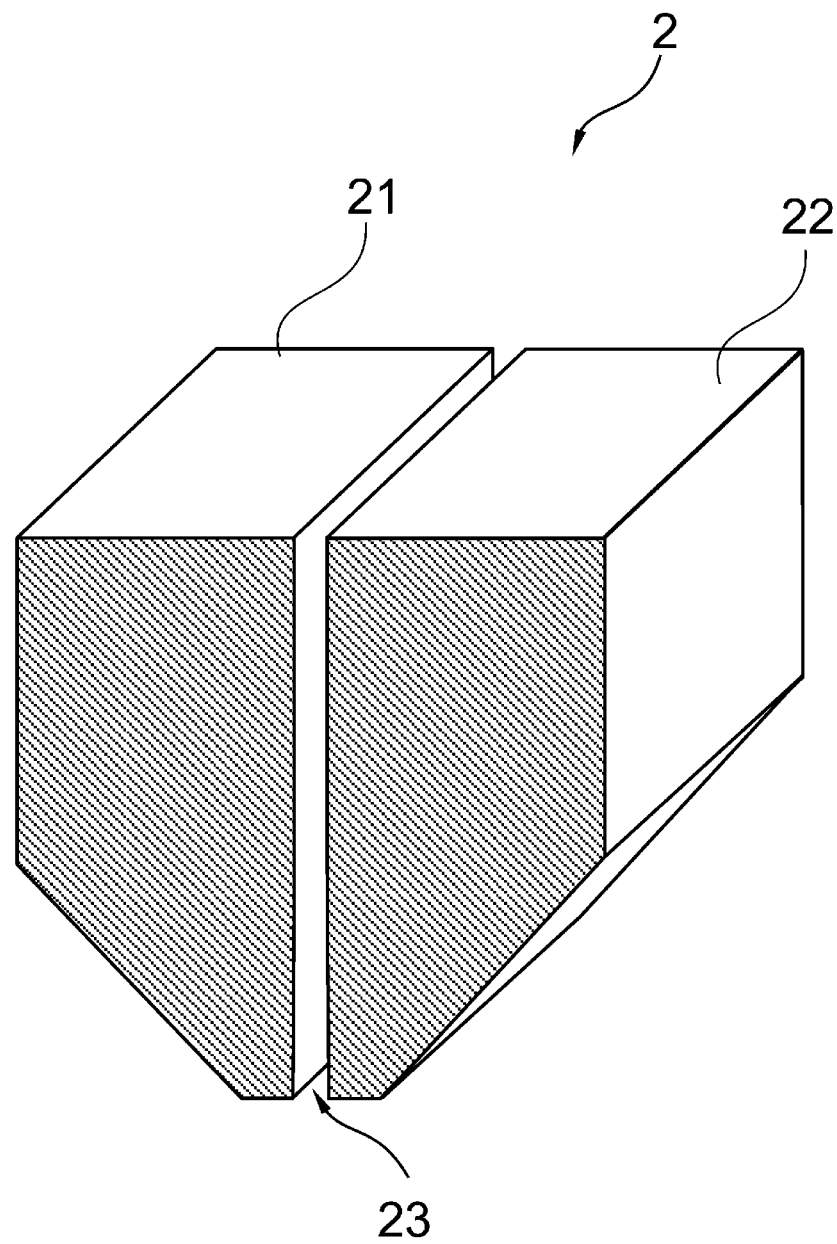
FIG. 3 is a perspective view illustrating a specific example of the configuration of a spinneret used for the production of a flat membrane.

As illustrated in FIG. 3, the spinneret 2 for production of a flat membrane is a slit die having two opposing blocks 21 and 22. Depiction of other members in the slit die is omitted. A gap (i.e., a slit 23) is provided between the block 21 and the block 22. At the time of production of a membrane, a resin solution is ejected from the slit 23, whereby the resin solution is molded (processed) into a sheet shape.

The step (d) is a step of solidifying the resin solution molded in the step (c) by developing solid-liquid thermally induced phase separation in a cooling bath.

The thermally induced phase separation is a method of cooling a resin solution dissolved in a poor or good solvent at a temperature not less than the crystallization temperature Tc, thereby solidifying. The thermally induced phase separation includes:

a liquid-liquid type where a resin solution uniformly dissolved at a high temperature is separated into resin-rich phase and resin-lean phase due to reduction in the dissolving ability of the solution during temperature drop, and a solid-liquid type where a resin solution uniformly dissolved at a high temperature is separated into a polymeric solid phase and a polymer-lean solution phase by crystallization occurred when cooled to not more than the crystallization temperature Tc during temperature drop.

In the liquid-liquid type, a fine three-dimensional network structure is formed by the rich phase, whereas in the solid-liquid type, a spherical structure is formed. Accordingly, a solid-liquid type is preferably employed for the production of the separation membrane of the present invention.

The cooling bath is preferably a mixed liquid containing a poor or good solvent in a concentration of 50 to 95 wt % and a nonsolvent in a concentration of 5 to 50 wt %. When the concentration of the nonsolvent is 50 wt % or less, coagulation by thermally induced phase separation can preferentially proceed relative to the coagulation by nonsolvent-induced phase separation. Here, as the concentration of the good solvent is lower, the coagulation rate increases, but when the temperature of the cooling bath is set low, even if the concentration of the good solvent is high, the coagulation can be promoted to smooth the separation membrane surface.

Examples of the good solvent include lower alkyl ketone, ester, amide, etc., such as N-methyl-2-pyrrolidone, dimethylsulfoxide, dimethylacetamide, dimethylformamide, methyl ethyl ketone, acetone, tetrahydrofuran, tetramethylurea and trimethyl phosphate, and a mixed solvent thereof.

Examples of the nonsolvent include an aliphatic hydrocarbon, an aromatic hydrocarbon, an aliphatic polyhydric alcohol, an aromatic polyhydric alcohol, a chlorinated hydrocarbon, and other chlorinated organic liquids, such as water, hexane, pentane, benzene, toluene, methanol, ethanol, carbon tetrachloride, o-dichlorobenzene, trichloroethylene, ethylene glycol, diethylene glycol, triethylene glycol, propylene glycol, butylene glycol, pentanediol, hexanediol and low-molecular-weight polyethylene glycol, a mixed solvent thereof, etc.

As for the poor solvent, use of the same poor solvent as in the resin solution is preferably employed.

The "good solvent" as used in the present description means a solvent that can dissolve 5 wt % or more of a solute even at a low temperature of less than 60° C. The "poor solvent" means a solvent that cannot dissolve 5 wt % or more at a low temperature of less than 60° C. but can dissolve 5 wt % or more in a high temperature region between 60° C. or more and not more than the melting point of a polyvinylidene fluoride-based resin. The "nonsolvent" means a solvent that can neither dissolve nor swell a solute until the melting point of the solute or the boiling point of the solvent.

The temperature of the cooling bath is lower than the crystallization temperature Tc of the polyvinylidene fluoride-based resin. The temperature of the cooling bath is preferably lower by 20° C. or more than the crystallization temperature Tc of the polyvinylidene fluoride-based resin.

In the step (e), the "start of the step (c)" indicates that the resin solution starts to be formed into a separation membrane shape. In the case of using a spinneret for a hollow fiber membrane illustrated in FIGS. 2(A), 2(B) and 2(C) and a spinneret for a flat membrane illustrated in FIG. 3, the point in time where the resin solution reaches the spinneret can be regarded as the start of the step (c). The "start of the step (d)" indicates the point in time where the resin solution reaches the cooling bath.

In the step (e), the "imparting a temperature gradient" indicates that, in a resin solution formed into a membrane shape, the temperature in part in the membrane thickness direction is differentiated from the temperature in other portions. More specifically, the "imparting a temperature gradient" indicates that, in a resin solution formed into a separation membrane shape, the temperature is caused to get higher from one surface toward another surface.

The specific technique for creating a temperature gradient includes, in the case of producing a hollow fiber membrane, conducting at least one of:

(1) setting the temperature of the spinneret 1 to be higher than the temperature of the resin solution supplied, (2) setting the temperature of a fluid passing through the inner nozzle 11 of the spinneret 1 to be higher than the temperature of the resin solution supplied, and (3) heating the resin solution flying in the air between the spinneret 1 and the cooling bath.

By conducting at least one of (1) and (3) described above, the spherical structure on the outer side of the hollow fiber membrane can be made relatively large. By conducting (2) described above, the spherical structure on the outer side of the hollow fiber membrane can be made relatively small. For conducting (3), a heating device such as heater may be disposed between the spinneret 1 and the cooling bath, or a device for blowing or applying a high-temperature solvent may be disposed.

The specific technique for "imparting a temperature gradient" includes, in the case of producing a flat membrane, conducting at least one of:

(1') setting the temperature of one of two blocks 21 and 22 opposing each other across a slit in the spinneret 2 that is a slit die, to be higher than the temperature of the resin solution supplied, and (2') heating one surface of the flat membrane-shaped resin solution flying in the air between the spinneret 2 that is a slit die, and the cooling bath. For conducting (2'), the same method as in (3) described above may be employed.

By "imparting a temperature gradient", it is preferable to create a state where the temperature in a portion intended to be formed as a spherical structure having a large average diameter is relatively higher than the temperature in a portion intended to be formed as a spherical structure having a small average diameter. That is, in order to increase the average diameter of the spherical structure in the surface layer of the membrane surface on the side coming into contact with liquid to be treated and reduce the average diameter on the inner side of the membrane, it is preferable to make the temperature of the surface layer be relatively higher than the temperature on the inner side.

In the method of making the temperature be relatively high, it may also be possible to lower the resin temperature in portions other than the portion intended to be formed as a spherical structure having a large average diameter, but in this case, the effect of reducing the size of the spherical structure on the side having a lowered resin solution temperature is small compared with the effect of increasing the size of the spherical structure by raising the resin temperature. The reason therefor is because formation of primary nuclei gradually proceeds in the semi-stable region as described above.

For example, in the case of imparting a temperature gradient to the resin solution in a relatively short time by cooling at a specific temperature, the conditions are insufficient for primary nucleus formation to proceed. On the other hand, the concentration of primary nuclei after formation decreases by being subjected to a relatively great effect of the temperature rise of the resin solution and consequently, the number of spherical structures after solidification decreases.

That is, the primary nucleus of the resin solution differs in the variation behavior for a temperature change between temperature rise and temperature drop. Accordingly, in the case of changing the spherical structure diameter by "imparting a temperature gradient", a step of partially raising the temperature of the resin solution is preferably used.

In this step (e), it may be sufficient if the temperature on the high temperature side of the temperature gradient is set to a temperature at which the concentration of primary crystal nuclei decreases compared to other portions of the resin solution.

When the temperature in part of the resin solution is set to a temperature at which the concentration of primary crystal nuclei decreases compared to other portions of the resin solution, a spherical structure having a large diameter can be formed in that portion.

In the step of imparting a temperature gradient, heating is preferably performed by setting the average temperature rise rate at the time of imparting a temperature gradient, i.e., the average temperature change rate (rising rate of temperature) of the resin solution, to be from 30 to 700° C./min for an imparting time (heating time) of 0.1 to 5.0 seconds.

Since the average temperature rise rate for temperature change is 30° C./min or more, high water permeation performance can be achieved by increasing the size of the spherical structure in the separation membrane surface. Since the temperature change rate is 700° C./min or less, the size of only the spherical structure in the separation membrane surface can be selectively increased and the strength/elongation can therefore be kept high. A temperature gradient is imparted to the resin solution by providing such a temperature change, whereby the number of primary nuclei in part of the resin solution can be controlled.

Since the heating time is 0.1 seconds or more, the high water permeation can be achieved by increasing the size of the spherical structure in the separation membrane surface. On the other hand, since the heating time is 5.0 seconds or less, the size of only the spherical structure in the separation membrane surface can be selectively increased and the strength/elongation can therefore be kept high. In the following, for the sake of convenience of description, the present invention is described using words "heating time" and "average temperature rise rate".

The average temperature rise rate can be calculated from the relationship between the resin solution temperature T2 immediately before the step (d) and the heating time by measuring T2 by means of a thermography, etc.

Average temperature rise rate (° C./min)=(resin temperature in molding process−T2) (° C.)/heating time (min)

Here, in the case of using a spinneret for a hollow fiber membrane illustrated in FIGS. 2(A), 2(B) and 2(C) and a spinneret for a flat membrane illustrated in FIG. 3, when a temperature gradient is provided to the resin solution by heating the spinneret for ejecting the resin solution, the heating time is the time required for the resin solution to pass through the spinneret.

As another step, in the production method of a separation membrane, it is also preferable to perform stretching after the step (d) so as to enlarge the void between spherical structures, thereby enhancing the water permeation performance, and increase the breaking strength. The temperature around the membrane at the time of stretching is preferably from 50 to 140° C., more preferably from 55 to 120° C., still more preferably from 60 to 100° C. The stretch ratio is preferably from 1.1 to 4 times, more preferably from 1.1 to 2 times.

When the membrane is stretched under the temperature condition of 50° C. or more, the membrane can be stably and homogeneously stretched. When the membrane is stretched under the temperature condition of 140° C. or less, since the stretching is performed at a temperature lower than the melting point (177° C.) of the polyvinylidene fluoride-based resin, the membrane is not melted even if stretched, so that the void can be enlarged while keeping the structure of the membrane and the water permeation performance can be enhanced.

Stretching is preferably performed in a liquid, because the temperature control is easy, but it may also be possible to perform the stretching in a gas such as steam.

As the liquid, water is simple and preferred, but in the case of stretching at a temperature of about 90° C. or more, use of a low-molecular-weight polyethylene glycol, etc., may be preferably employed. On the other hand, in the case of not performing such stretching, compared with the case of performing stretching, the water permeation performance and the breaking strength may be reduced, but the elongation at break and the blocking performance are enhanced. Accordingly, the presence or absence of a stretching step and the stretch ratio in the stretching step can be appropriately set according to intended use of the separation membrane.

The temperature condition described above is applied to the temperature of the liquid when stretching is performed in a liquid, and applied to the temperature of the gas when stretching is performed in a gas. These production methods can be applied without any particular limitation as long as the resin is a thermoplastic resin capable of forming a spherical structure by thermally induced phase separation.

The separation membrane of the present invention may be a composite separation membrane in which another layer other than a spherical structure is stacked. In the case where another layer is stacked on the spherical structure layer on the liquid-to-be-treated side, the portion coming into contact with liquid to be treated is the another layer, and the spherical structure layer does not contribute to resistance of the separation membrane to clogging, but the filtration resistance at the interface between the spherical structure layer and another layer is reduced, and a composite separation membrane having high water permeation performance is thereby obtained.

The method for obtaining a composite separation membrane includes a method of simultaneously forming a spherical structure layer and another layer, and a method of sequentially forming another layer on the separation membrane having a spherical structure layer.

The former includes, for example, a method of performing complex molding with another resin solution by using a multi-slit die or a multi-tube spinneret in the step (c). The latter includes, for example, a method where a resin solution for forming another layer is applied to the separation membrane obtained after the step (d) and the stretching step and then scraped and formed by means of a nozzle or a slit coater, and a method of performing spray-coating with a resin solution for forming another layer.

Among these, the method where a resin solution for forming another layer is applied after the step (d) and the stretching step and then scraped, molded and solidified, is simple and easy and is preferred.

In the production of a composite separation membrane by the method described above, the resin solution for forming another layer is not particularly limited, but in the case of aiming at modification or densification of the separation membrane surface, a three-dimensional network structure is preferably used. In the case of a composite separation membrane including a spherical structure and a three-dimensional network structure, in order to form a three-dimensional network structure, a nonsolvent-induced phase separation method can be utilized. Here, the nonsolvent-induced phase separation is phase separation of solidifying a resin solution by contacting it with a nonsolvent.

In the case of utilizing a nonsolvent-induced phase separation method, the solvent of the resin solution is preferably a good solvent for the resin and, for example, the good solvent for a polyvinylidene fluoride-based resin includes lower alkyl ketone, ester, amide, etc., such as N-methyl-2-pyrrolidone, dimethylacetamide, dimethylformamide, methyl ethyl ketone, acetone and tetrahydrofuran, and a mixed solvent thereof. The good solvent as used herein is a solvent that can dissolve 5 wt % or more of a polyvinylidene fluoride-based resin even at a low temperature of less than 60° C.

The nonsolvent is defined as a solvent that can neither dissolve nor swell a polyvinylidene fluoride-based resin until the melting point of the polyvinylidene fluoride-based resin or the boiling point of the solvent. The nonsolvent for the polyvinylidene fluoride-based resin includes an aliphatic hydrocarbon, an aromatic hydrocarbon, an aliphatic polyhydric alcohol, an aromatic polyhydric alcohol, a chlorinated hydrocarbon, and other chlorinated organic liquids, such as water, hexane, pentane, benzene, toluene, methanol, ethanol, carbon tetrachloride, o-dichlorobenzene, trichloroethylene, ethylene glycol, diethylene glycol, triethylene glycol, propylene glycol, butylene glycol, pentanediol, hexanediol and low-molecular-weight polyethylene glycol, a mixed solvent thereof, etc.

EXAMPLES

The present invention is described below by referring to specific Examples, but the present invention is not limited to these Examples. Here, the parameters relating to the present invention were measured by the following methods.

(1) Average Diameter D1 of Spherical Structure S1

A cross-section perpendicular to the separation membrane surface (i.e., a cross-section parallel to the thickness direction) was photographed at 1,000 to 5,000 times by using an electron microscope. In the obtained image, an arbitrary region of 10 μm in thickness direction from the first surface of the separation membrane and 100 μm in width direction was selected, and the diameters of all spherical structures present in the region were measured. An arithmetic average of the obtained numerical values was calculated to obtain the average diameter D1.

(2) Average Diameter D2 of Spherical Structure S2

A cross-section perpendicular to the separation membrane surface was photographed at 1,000 to 5,000 times by using an electron microscope, and an arbitrary region of 10 μm in thickness direction×100 μm in width direction, between a position 10 μm deep in the thickness direction from the second surface (the surface opposite the first surface) of the separation membrane and a position 20 μm deep in the thickness direction from the same surface, was selected, and the diameters of all spherical structures present in the region were measured. An arithmetic average of the obtained numerical values was calculated to obtain the average diameter D2.

(3) Average Diameter D3 of Spherical Structure S3

A cross-section perpendicular to the separation membrane surface was photographed at 1,000 to 5,000 times by using an electron microscope, and an arbitrary region of 10 μm in thickness direction×100 μm in width direction, between a position 10 μm deep in the thickness direction from the first surface and a position 20 μm deep in the thickness direction from the same surface, was selected, and the diameters of all spherical structures present in the region were measured. An arithmetic average of the obtained numerical values was calculated to obtain the average diameter D3.

(4) Measurement of Spherical Structure of Composite Separation Membrane

The boundary of a layer stacked and a spherical structure layer of a composite separation membrane was linearly divided to define an interface. A segment of 100 μm in the width direction was linearly fixed to contain only spherical structures on the line demarcating the interface, an arbitrary region of 10 μM in the thickness direction from the segment was selected, and the diameter of each spherical structure was measured by the same methods as in (1) to (3) described above. Respective arithmetic averages of the resulting numerical values were calculated to obtain the average diameters D1, D2 and D3.

(5) Water Permeation Performance of Separation Membrane
<Hollow Fiber Membrane>

A small module of about 20 cm in length including approximately from 1 to 10 hollow fiber membranes was manufactured, and a value obtained by feeding distilled water from the surface side having a spherical structure S1 under the conditions of a temperature of 25° C. and a filtration differential pressure of 16 kPa and measuring the permeation amount ($m^3$) of water for a predetermined time was converted into a value per unit time (hr), unit effective membrane area ($m^2$) and 50 kPa.

<Flat Membrane>

The membrane was cut into a circle of 50 mm in diameter and set in a cylindrical filtration holder, and a value obtained by feeding distilled water from the surface side having a spherical structure S1 under the conditions of a temperature of 25° C. and a filtration differential pressure of 10 kPa and measuring the permeation amount ($m^3$) of water for a predetermined time was converted into a value per unit time (hr), unit effective membrane area ($m^2$) and 50 kPa.

(6) Breaking Strength and Elongation at Break of Separation Membrane

These were determined by measurement using a tensile tester (TENSILON®100, manufactured by Baldwin Company Ltd.) with a 5 kg full-scale load at a crosshead speed of 50 mm/min. The test piece, in the case of a hollow fiber membrane, was used in wetted state for measurement at a test length of 50 mm and, in the case of a flat membrane, was cut into No. 1 dumbbell shape in conformity with JIS K 6251 (2010) and used in wetted state for measurement.

(7) Crystallization Temperature Tc of Polyvinylidene Fluoride-Based Resin Solution Using DSC-620-0 manufactured by Seiko Instruments & Electronics Ltd., a mixture having the same composition as the composition of a polymer stock solution for membrane production, such as polyvinylidene fluoride-based resin and solvent, was sealed in a closed DSC container and uniformly dissolved by raising the temperature to a dissolution temperature at a temperature rise rate of 10° C./min and holding it for 30 minutes. A crystallization peak rising temperature observed thereafter in the process of lowering the temperature at a temperature drop rate of 10° C./min was defined as the crystallization temperature Tc.

(8) Degree of Filtration Resistance Elevation

<Module for Flat Membrane Evaluation>

The flat membrane was cut into a circle of 50 mm in diameter and set in a cylindrical filtration holder.

<Module for Hollow Fiber Membrane Evaluation>

A miniature membrane module having a length of 15 mm was manufactured by housing 6 hollow fiber membranes in an outer cylinder and fixing ends.

<Evaluation Method>

Raw water was charged into a 10 L stainless steel-made pressure tank ADVANTEC PRESSURE VESSEL DV-10 equipped with a pressure gauge. As the raw water, a suspended matter-containing solution (bentonite: 10 ppm, calcium sulfate: 10 ppm, humic acid: 5 ppm) was used. The raw water was filtrated by dead-end filtration from the spherical structure S1 surface of the separation membrane.

The 2-way stopcock of the raw water-containing pressure tank (hereinafter, referred to as raw water tank) was connected to the membrane module by using a Teflon (registered trademark) tube. A pressure was applied to the raw water tank by adjusting compressed air of 0.2 MPa to 50 kPa by means of an SMC regulator (AF2000-02, AR2000-02G), and the 2-way stopcock was then opened, thereby feeding raw water into the membrane module.

The weight of the permeate was measured every 5 seconds by means of an electronic balance AND HF-6000 connected to a personal computer and recorded using a continuous recording program AND RsCom ver. 2.40. Since the data obtained in this test is the weight of the permeate per 5 seconds, filtration resistance was calculated using the equation shown below.

Filtration Resistance (1/m)=(filtration pressure (kPa))×10³×5×(membrane area (m²))×10⁶/[(viscosity of permeate (Pa·s)×(weight of permeate per 5 seconds (g/s))×(density of permeate (g/ml))]

In a graph where from the obtained date, the total filtration amount of water per unit membrane area and the calculated filtration resistance were plotted respectively on the abscissas and the ordinate, the gradient of linear approximation from 0 L/m² to 50 L/m² of the total filtration amount per unit membrane area was determined and defined as the degree of filtration resistance elevation (1/m²).

Example 1

38 wt % of a vinylidene fluoride homopolymer having a weight average molecular weight of 417,000 and 62 wt % of dimethylsulfoxide were dissolved at 120° C. This resin solution was fed to a slit die having the structure of FIG. 3 while keeping the solution at 75° C. that is within the range of (Tc+20)° C. to (Tc+55)° C., for 20 seconds under a pressure of 1.2 MPa. During feed of the solution, in the slit die, one block out of two blocks opposing each other across a slit was set to 80° C., and another block was set to the same temperature (75° C.) as the resin solution temperature immediately before feed to the slit die.

The resin solution was ejected in a flat plate shape from the slit die 1.85 seconds after entering the slit die. The ejected resin solution was solidified for 5 minutes in a bath at a temperature of 5° C. containing an aqueous 90 wt % dimethylsulfoxide solution. After the solidification, the obtained membrane was washed with water. In this Example, since the heating time until the resin solution was solidified after starting molding into a flat membrane shape was 1.85 seconds, the average temperature rise rate of the resin solution put into contact with the heated block was 162° C./min.

The obtained flat membrane had spherical structures, the average diameter D1 of the spherical structure S1 was 2.38 μm, the average diameter D2 of the spherical structure S2 was 1.67 μm, the average diameter D3 of the spherical structure S3 was 1.78 μm, D1/D3 was 1.34, the difference (D1−D3) between D1 and D3 was 0.60 μm, and the difference (D3−D2) between D3 and D2 was 0.11 μm. The membrane structure and membrane performance of the obtained flat membrane are shown in Table 1.

Example 2

A flat membrane was manufactured under the same conditions as in Example 1 except that the average temperature rise rate of the resin solution passing through the slit die was changed. Specifically, the flat membrane was manufactured as follows.

A resin solution prepared in the same manner as in Example 1 was fed to a slit die having the structure illustrated in FIG. 3 while keeping the solution at 75° C. that is within the range of (Tc+20)° C. to (Tc+55)° C., for 20 seconds under a pressure of 1.2 MPa. During feed of the solution, one block in the slit die was set to 94° C., and another block was set to the same temperature (75° C.) as the resin solution temperature immediately before feed to the slit die.

The resin solution was ejected in a flat plate shape from the slit die 1.85 seconds after entering the slit die. The ejected resin solution was solidified for 5 minutes in a bath at a temperature of 5° C. containing an aqueous 90 wt % dimethylsulfoxide solution. After the solidification, the obtained membrane was washed with water. In this Example, since the heating time until the resin solution was solidified after starting molding into a flat membrane shape was 1.85 seconds, the average temperature rise rate of the resin solution put into contact with the heated block was 616° C./min.

The obtained flat membrane had spherical structures, the average diameter D1 of the spherical structure S1 was 3.16 μm, the average diameter D2 of the spherical structure S2 was 1.82 μm, the average diameter D3 of the spherical structure S3 was 1.73 μm, D1/D3 was 1.83, (D1−D3) was 1.43 μm, and (D3−D2) was −0.09 μm. The membrane structure and membrane performance of the obtained flat membrane are shown in Table 1.

Example 3

40 wt % of a vinylidene fluoride homopolymer having a weight average molecular weight of 417,000 and 60 wt % of γ-butyrolactone were dissolved at 160° C. This resin solution was fed to a slit die having the structure illustrated in FIG. 3 while keeping the solution at 95° C. that is within the range of (Tc+20)° C. to (Tc+55)° C., for 10 seconds under a pressure of 2.0 MPa. During feed of the solution, one block in the slit die was set to 102° C., and another block was set to the same temperature (95° C.) as the resin solution temperature immediately before feed to the slit die.

The resin solution was ejected in a flat plate shape from the slit die 1.85 seconds after entering the slit die. The ejected resin solution was solidified for 5 minutes in a bath at a temperature of 5° C. containing an aqueous 90 wt % γ-butyrolactone solution. After the solidification, the obtained membrane was washed with water. In this Example, since the heating time until the resin solution was solidified after starting molding into a flat membrane shape was 1.85 seconds, the average temperature rise rate of the resin solution put into contact with the heated block was 227° C./min.

The obtained flat membrane had spherical structures, the average diameter D1 of the spherical structure S1 was 1.39 µm, the average diameter D2 of the spherical structure S2 was 0.63 µm, the average diameter D3 of the spherical structure S3 was 0.61 µm, D1/D3 was 2.28, (D1–D3) was 0.78 µm, and (D3–D2) was −0.02 µm. The membrane structure and membrane performance of the obtained flat membrane are shown in Table 1.

Example 4

A resin solution prepared in the same manner as in Example 1 was fed to a slit die in which only one block was heated at 61° C., while keeping the solution at 57° C. that is within the range of (Tc+20)° C. to (Tc+55)° C., for 20 seconds under a pressure of 0.5 MPa. The resin solution was ejected in a flat plate shape from the slit die 0.38 seconds after entering the slit die. The ejected resin solution was solidified for 5 minutes in a bath at a temperature of 5° C. containing an aqueous 90 wt % dimethylsulfoxide solution. After the solidification, the obtained membrane was washed with water. In this Example, since the heating time until the resin solution was solidified after starting molding into a flat membrane shape was 0.38 seconds, the average temperature rise rate of the resin solution put into contact with the heated block was 632° C./min. In the slit die, due to feed of the resin solution, the temperature of the block on the non-heated side became equal to the resin solution temperature (57° C.) immediately before entering the slit die.

The obtained flat membrane had spherical structures, the average diameter D1 of the spherical structure S1 was 3.92 µm, the average diameter D2 of the spherical structure S2 was 1.20 µm, the average diameter D3 of the spherical structure S3 was 1.21 µm, D1/D3 was 3.24, (D1–D3) was 2.71 µm, and (D3–D2) was 0.01 µm. The membrane structure and membrane performance of the obtained flat membrane are shown in Table 1.

Example 5

A resin solution prepared in the same manner as in Example 1 was fed to a slit die in which only one block was heated at 79° C., while keeping the solution at 75° C. that is within the range of (Tc+20)° C. to (Tc+55)° C., for 20 seconds under a pressure of 1.2 MPa. The resin solution was ejected in a flat plate shape from the slit die 4.80 seconds after entering the slit die. The ejected resin solution was solidified for 5 minutes in a bath at a temperature of 5° C. containing an aqueous 90 wt % dimethylsulfoxide solution. After the solidification, the obtained membrane was washed with water. In this Example, since the heating time until the resin solution was solidified after starting molding into a flat membrane shape was 4.80 seconds, the average temperature rise rate of the resin solution put into contact with the heated block was 50° C./min. In the slit die, due to feed of the resin solution, the temperature of the block on the non-heated side became equal to the resin solution temperature (75° C.) immediately before entering the slit die.

The obtained flat membrane had spherical structures, the average diameter D1 of the spherical structure S1 was 1.84 µm, the average diameter D2 of the spherical structure S2 was 1.36 µm, the average diameter D3 of the spherical structure S3 was 1.37 µm, D1/D3 was 1.34, (D1–D3) was 0.47 µm, and (D3–D2) was 0.01 µm. An electron micrograph of the vicinities of a first surface and a second surface of the obtained flat membrane is illustrated in FIG. 1, and the membrane structure and membrane performance are shown in Table 1.

Example 6

38 wt % of a vinylidene fluoride homopolymer having a weight average molecular weight of 417,000 and 62 wt % of γ-butyrolactone were dissolved at 160° C. This resin solution was fed to a double-tube spinneret with the outer tube being heated at 99° C., while keeping the solution at 95° C. that is within the range of (Tc+20)° C. to (Tc+55)° C., for 20 seconds under a pressure of 1.2 MPa. The resin solution was ejected 1.68 seconds after entering the double-tube spinneret. While passing the resin solution through the outer tube of the spinneret, an aqueous 90 wt % γ-butyrolactone solution at 95° C. was ejected at the same time from the inner tube of the double-tube spinneret. The ejected resin solution was solidified for 5 minutes in a bath at a temperature of 5° C. containing an aqueous 90 wt % γ-butyrolactone solution. After the solidification, the obtained membrane was washed with water. In this Example, since the heating time until the resin solution was solidified after starting formation into a hollow fiber shape was 1.68 seconds, the average temperature rise rate of the resin solution put into contact with the outer tube of the spinneret was 143° C./min.

The obtained external pressure-type hollow fiber membrane had spherical structures, the average diameter D1 of the spherical structure S1 was 2.58 µm, the average diameter D2 of the spherical structure S2 was 1.86 µm, the average diameter D3 of the spherical structure S3 was 1.96 µm, D1/D3 was 1.32, (D1–D3) was 0.62 µm, and (D3–D2) was 0.10 µm. The membrane structure and membrane performance of the obtained flat membrane are shown in Table 1.

Example 7

38 wt % of a vinylidene fluoride homopolymer having a weight average molecular weight of 417,000 and 62 wt % of dimethylsulfoxide were dissolved at 120° C. This resin solution was fed to an outer tube of a double-tube spinneret while keeping the solution at 75° C. that is within the range of (Tc+20)° C. to (Tc+55)° C., for 10 seconds under a pressure of 0.8 MPa. The outer tube of the double-tube spinneret had been heated at 80° C. The resin solution was ejected 1.68 seconds after entering the double-tube spinneret. While passing the resin solution through the outer tube of the spinneret, an aqueous 90 wt % dimethylsulfoxide solution at 75° C. was at the same time passed through the inner tube of the double-tube spinneret. The ejected resin solution was solidified for 5 minutes in a bath at a temperature of 5° C. containing an aqueous 90 wt % dimethylsulfoxide solution. After the solidification, the obtained membrane was washed with water. In this Example, since the heating time until the resin solution was solidified after starting formation into a hollow fiber shape was 1.68 seconds, the average temperature rise rate of the resin solution put into contact with the outer tube of the double-tube spinneret was 179° C./min.

The obtained external pressure-type hollow fiber membrane had spherical structures, the average diameter D1 of the spherical structure S1 was 2.54 µm, the average diameter D2 of the spherical structure S2 was 1.89 µm, the average diameter D3 of the spherical structure S3 was 1.81 μm, D1/D3 was 1.40, (D1−D3) was 0.73 μm, and (D3−D2) was −0.08 μm. The membrane structure and membrane performance of the obtained flat membrane are shown in Table 1.

Example 8

As with Example 1, Resin Solution 1 maintained at 75° C. that is within the range of (Tc+20)° C. to (Tc+55)° C., for 20 seconds under a pressure of 1.2 MPa was prepared. Next, 15 wt % of a vinylene fluoride homopolymer having a weight average molecular weight of 280,000, 7 wt % of ethylene glycol and 78 wt % of N-methyl-2-pyrrolidone were dissolved at 100° C., and the solution was kept at 90° C. to prepare Resin Solution 2. Resin Solutions 1 and 2 were fed to a slit die. During feed of Resin Solution 1, one block out of two blocks opposing each other across a slit was set to 90° C., and another block was set to the same temperature (75° C.) as the resin solution temperature immediately before feed to the slit die. During feed of Resin Solution 2, both of two blocks opposing each other across a slit were set to 90° C., and Resin Solutions 1 and 2 were simultaneously ejected in the state of being stacked such that their 90° C. surfaces overlap.

The resin solution was ejected in a flat plate shape 2.85 seconds after feed to the slit die and solidified for 5 minutes in a bath at a temperature of 5° C. containing an aqueous 50 wt % dimethylsulfoxide solution. After the solidification, the obtained membrane was washed with water. In this Example, since the heating time until Resin Solution 1 was solidified after starting molding into a flat membrane shape was 2.85 seconds, the average temperature rise rate of the resin solution was 316° C./min.

The obtained flat membrane had a structure in which a network structure is stacked on a spherical structure, the average diameter D1 of the spherical structure S1 was 2.83 μm, the average diameter D2 of the spherical structure S2 was 1.98 μm, the average diameter D3 of the spherical structure S3 was 1.79 pull, D1/D3 was 1.58, (D1−D3) was 1.04 μm, and (D3−D2) was −0.19 μm. The membrane structure and membrane performance of the obtained flat membrane are shown in Table 1.

Example 9

As with Example 1, Resin Solution 1 maintained at 95° C. that is within the range of (Tc+20)° C. to (Tc+55)° C., for 20 seconds under a pressure of 1.2 MPa was prepared. Next, 15 wt % of a vinylene fluoride homopolymer having a weight average molecular weight of 280,000, 7 wt % of ethylene glycol and 78 wt % of N-methyl-2-pyrrolidone were dissolved at 100° C., and the solution was kept at 100° C. to prepare Resin Solution 2. Resin Solutions 1 and 2 and a hollow part-forming solution composed of an aqueous 90 wt % γ-butyrolactone solution were fed to a triple-tube spinneret, and three components were simultaneously ejected (hereinafter, for the sake of convenience, the innermost tube, intermediate tube and outermost tube of the triple-tube spinneret are referred to as "first tube", "second tube" and "third tube", respectively).

The hollow part-forming solution, Resin Solution 1 and Resin solution 2 were ejected respectively from the inside of the first tube of the triple-tube spinneret, from a slit between the first tube and the second tube, and from a slit between the second tube and the third tube. At this time, the first tube was set to 95° C., and the second and third tubes were set to 100° C. The ejected resin solution was solidified for 5 minutes in a bath at a temperature of 5° C. containing an aqueous 50 wt % γ-butyrolactone solution. After the solidification, the obtained membrane was washed with water. In this Example, since the heating time until the resin solution was solidified after starting formation into a hollow fiber shape was 1.96 seconds, the average temperature rise rate of the resin solution was 153° C./min.

The obtained external pressure-type hollow fiber membrane had a structure in which a network structure is stacked on a spherical structure, the average diameter D1 of the spherical structure S1 was 2.83 μm, the average diameter D2 of the spherical structure S2 was 1.99 μm, the average diameter D3 of the spherical structure S3 was 1.87 μm, D1/D3 was 1.51, (D1−D3) was 0.96 μm, and (D3−D2) was −0.12 μm. The membrane structure and membrane performance of the obtained hollow fiber membrane are shown in Table 1.

In Examples 1 to 9, D1 is from 1.39 μm to 3.92 μm, D2 is from 0.63 μm to 1.99 μm, D3 is from 0.61 μm to 1.96 μm, D1/D3 is from 1.32 to 3.24, (D1−D3) is from 0.47 to 2.71 μm, and (D3−D2) is from −0.19 μm to 0.11 μm. These numerical value ranges are included in examples of the preferable range of each parameter.

Comparative Example 1

A resin solution prepared in the same manner as in Example 1 was fed to a slit die while keeping the solution at 75° C. that is within the range of (Tc+20)° C. to (Tc+55)° C. Both blocks of the slit die were set to a temperature of 75° C. The ejected resin solution was solidified for 5 minutes in a bath at a temperature of 5° C. containing an aqueous 90 wt % dimethylsulfoxide solution. After the solidification, the obtained membrane was washed with water.

The obtained flat membrane had spherical structures, the average diameter D1 of the spherical structure S1 was 1.76 μm, the average diameter D2 of the spherical structure S2 was 1.71 μm, the average diameter D3 of the spherical structure S3 was 1.72 μm, D1/D3 was 1.02, (D1−D3) was 0.04 (D3−D2) was 0.01 μm, and thus, the difference among the spherical structure diameters of D1, D2 and D3 was small. The membrane structure and membrane performance of the obtained flat membrane are shown in Table 2. The membrane of Comparative Example 1 had strength/elongation comparable to that of Example 1 but was a separation membrane having low water permeation performance and readily causing elevation of filtration resistance.

Comparative Example 2

A resin solution prepared in the same manner as in Example 3 was fed to a slit die in which only one block was heated at 120° C., while keeping the solution at 95° C. that is within the range of (Tc+20)° C. to (Tc+55)° C. The resin solution was ejected 1.85 seconds after entering the slit die. The ejected resin solution was solidified for 5 minutes in a bath at a temperature of 5° C. containing an aqueous 90 wt % γ-butyrolactone solution. After the solidification, the obtained membrane was washed with water. In this Comparative Example, since the heating time until the resin solution was solidified after entering the slit die was 1.85 seconds, the average temperature rise rate of the resin solution put into contact with the heated block was 810° C./min. In the slit die, the temperature of the block on the non-heated side was set to the resin solution temperature (95° C.) immediately before entering the slit die.

The obtained flat membrane had spherical structures, the average diameter D1 of the spherical structure S1 was 3.14 µm, the average diameter D2 of the spherical structure S2 was 0.64 µm, the average diameter D3 of the spherical structure S3 was 0.62 µm, D1/D3 was 5.06, (D1−D3) was 2.52 µm, and (D3−D2) was −0.02 µm. The membrane structure and membrane performance of the obtained flat membrane are shown in Table 2. The membrane of Comparative Example 2 was a separation membrane in which the water permeation performance thereof was higher than that in Example 3 but the strength/elongation was significantly reduced.

Comparative Example 3

A resin solution prepared in the same manner as in Example 1 was fed to a slit die while keeping the solution at 75° C. that is within the range of (Tc+20)° C. to (Tc+55)° C. During feed of the solution, one block of the slit die was set to 138° C., and another block was set to the same temperature (75° C.) as the resin solution immediately before feed to the slit die. The resin solution was ejected 5.23 seconds after entering the slit die. The ejected resin solution was solidified for 5 minutes in a bath at a temperature of 5° C. containing an aqueous 90 wt % dimethylsulfoxide solution. After the solidification, the obtained membrane was washed with water. In this Comparative Example, the average temperature rise rate of the resin solution put into contact with the slit die on the heating surface of the heated slit die was 723° C./min. In the slit die, the temperature of the block on the non-heated side was set to the resin solution temperature (75° C.) immediately before entering the slit die.

The obtained flat membrane had spherical structures, the average diameter D1 of the spherical structure S1 was 3.35 µm, the average diameter D2 of the spherical structure S2 was 3.11 µm, the average diameter D3 of the spherical structure S3 was 3.06 µm, D1/D3 was 1.09, (D1−D3) was 0.29 µm, and (D3−D2) was −0.05 µm. The membrane structure and membrane performance of the obtained flat membrane are shown in Table 2. The membrane of Comparative Example 3 was a separation membrane in which the water permeation performance thereof was higher than those in Examples 1, 2 and 5 but the strength/elongation was significantly reduced.

Comparative Example 4

Resin Solutions 1 and 2 were simultaneously ejected from the slit die in the same manner as in Example 8 except that, in Example 8, the temperature gradient was eliminated by setting the resin solutions at 75° C. The resin solution was ejected in a flat plate shape 2.85 seconds after feed to the slit die and solidified for 5 minutes in a bath at a temperature of 5° C. containing an aqueous 50 wt % dimethylsulfoxide solution. After the solidification, the obtained membrane was washed with water.

The obtained flat membrane had a structure in which a network structure is stacked on a spherical structure, the average diameter D1 of the spherical structure S1 was 1.67 µm, the average diameter D2 of the spherical structure S2 was 1.59 µm, the average diameter D3 of the spherical structure S3 was 1.60 µm, D1/D3 was 1.04, (D1−D3) was 0.07 µm, and (D3−D2) was 0.01 µm. The membrane structure and membrane performance of the obtained flat membrane are shown in Table 2. The membrane of Comparative Example 4 was a separation membrane in which the water permeation performance thereof was lower than that in Example 8.

In Tables 1 and 2, "DMSO" stands for dimethylsulfoxide, and "GBL" stands for γ-butyrolactone.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| Solvent | DMSO | DMSO | GBL | DMSO | DMSO | GBL | DMSO | DMSO | GBL |
| Polymer concentration (wt %) | 38 | 38 | 40 | 38 | 38 | 38 | 38 | 38 | 38 |
| Dissolution temperature (° C.) | 120 | 120 | 160 | 120 | 120 | 160 | 120 | 120 | 160 |
| Resin solution temperature (° C.) | 75 | 75 | 95 | 57 | 75 | 95 | 75 | 75 | 95 |
| Average temperature rise rate (° C./min) | 162 | 616 | 227 | 632 | 50 | 143 | 179 | 316 | 153 |
| Temperature rise time (sec) | 1.85 | 1.85 | 1.85 | 0.38 | 4.80 | 1.68 | 1.68 | 2.85 | 1.96 |
| Injection liquid | — | — | — | — | — | GBL 90% | DMSO 90% | — | GBL 90% |
| Injection liquid temperature (° C.) | — | — | — | — | — | 95 | 75 | — | 95 |
| Coagulation bath | DMSO 90% | DMSO 90% | GBL 90% | DMSO 90% | DMSO 90% | GBL 90% | DMSO 90% | DMSO 50% | GBL 50% |
| Membrane shape | flat membrane | flat membrane | flat membrane | flat membrane | flat membrane | hollow fiber membrane | hollow fiber membrane | flat membrane | hollow fiber membrane |
| Average spherical diameter D1 (µm) | 2.38 | 3.16 | 1.39 | 3.92 | 1.84 | 2.58 | 2.54 | 2.83 | 2.83 |
| Average spherical diameter D2 (µm) | 1.67 | 1.82 | 0.63 | 1.20 | 1.36 | 1.86 | 1.89 | 1.98 | 1.99 |
| Average spherical diameter D3 (µm) | 1.78 | 1.73 | 0.61 | 1.21 | 1.37 | 1.96 | 1.81 | 1.79 | 1.87 |
| D1/D3 | 1.34 | 1.83 | 2.28 | 3.24 | 1.34 | 1.32 | 1.40 | 1.58 | 1.51 |
| D1 − D3 | 0.60 | 1.43 | 0.78 | 2.71 | 0.47 | 0.62 | 0.73 | 1.04 | 0.96 |
| D3 − D2 | 0.11 | −0.09 | −0.02 | 0.01 | 0.01 | 0.10 | −0.08 | −0.19 | −0.12 |
| Water permeation performance (m$^3$/m$^2$·hr) | 1.2 | 1.9 | 0.3 | 1.4 | 0.8 | 0.9 | 1.0 | 0.5 | 0.4 |
| Strength (MPa) | 13.4 | 10.5 | 22.3 | 11.5 | 15.7 | 18.6 | 14.6 | 12.8 | 16.2 |
| Elongation (%) | 151 | 128 | 489 | 186 | 211 | 247 | 181 | 78 | 135 |
| Degree of filtration resistance elevation ×10$^{12}$ (1/m) | 13.2 | 8.1 | 15.1 | 11.5 | 14.6 | 10.7 | 12.1 | 21.9 | 20.3 |

TABLE 2

|  | Comparative Example 1 | Comparative Example 2 | Comparative Example 3 | Comparative Example 4 |
|---|---|---|---|---|
| Solvent | DMSO | GBL | DMSO | DMSO |
| Polymer concentration (wt %) | 38 | 40 | 38 | 38 |
| Dissolution temperature (° C.) | 120 | 160 | 120 | 120 |
| Resin solution temperature (° C.) | 75 | 95 | 75 | 75 |
| Average temperature rise rate (° C./min) | — | 810 | 723 | — |
| Temperature rise time (sec) | — | 1.85 | 5.23 | — |
| Injection liquid | — | — | — | — |
| Injection liquid temperature (° C.) | — | — | — | — |
| Coagulation bath | DMSO 90% | GBL 90% | DMSO 90% | DMSO 50% |
| Membrane shape | flat membrane | flat membrane | flat membrane | flat membrane |
| Average spherical diameter D1 (μm) | 1.76 | 3.14 | 3.35 | 1.67 |
| Average spherical diameter D2 (μm) | 1.71 | 0.64 | 3.11 | 1.59 |
| Average spherical diameter D3 (μm) | 1.72 | 0.62 | 3.06 | 1.60 |
| D1/D3 | 1.02 | 5.06 | 1.09 | 1.04 |
| D1 − D3 | 0.04 | 2.52 | 0.29 | 0.07 |
| D3 − D2 | 0.01 | −0.02 | −0.05 | 0.01 |
| Water permeation performance (m³/m² · hr) | 0.4 | 0.8 | 2.4 | 0.1 |
| Strength (MPa) | 14.8 | 8.2 | 3.8 | 15.2 |
| Elongation (%) | 193 | 43 | 15 | 182 |
| Degree of filtration resistance elevation ×10¹² (1/m) | 19.8 | 9.5 | 7.4 | 16.5 |

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2014-139397) filed on Jul. 7, 2014, the contents of which are incorporated herein by way of reference.

INDUSTRIAL APPLICABILITY

The separation membrane of the present invention has both very high chemical and physical durability and high water permeation performance and can therefore be effectively utilized in the field of water treatment, etc.

DESCRIPTION OF REFERENCE NUMERALS AND SIGNS

S1, S2, S3 Spherical structure
1 Spinneret
11 Inner nozzle
111 Inner nozzle inlet
112 Inner nozzle outlet
12 Annular nozzle
121 Annular nozzle inlet
122 Annular nozzle outlet
2 Spinneret
21, 22 Block
23 Slit

The invention claimed is:

1. A separation membrane layer having a first surface for contacting liquid to be treated and a second surface disposed on the opposite side of the separation membrane layer through which treated liquid exits, wherein
the separation membrane layer comprises solid spherical structures formed of a polyvinylidene fluoride-based resin,
an average diameter $D1$ of the solid spherical structures $S1$ in a region within 10 μm from the first surface and an average diameter $D2$ of the solid spherical structures $S2$ in a region of 10 μm to 20 μm from the second surface satisfy a relational expression of $D1 > D2$,
the average diameter $D1$ and an average diameter $D3$ of the solid spherical structures $S3$ in a region of 10 μm to 20 μm from the first surface satisfy a relational expression of
$1.0 < D1/D3 < 4.00$, and
the separation membrane layer has an entire thickness of from 40 μm to 500 μm.

2. The separation membrane according to claim 1, wherein the average diameter $D1$ and the average diameter $D3$ satisfy a relational expression of $0.00$ μm $< (D1-D3) < 2.00$ μm.

3. The separation membrane according to claim 1, wherein the average diameter $D1$ is from 2.00 μm to 4.00 μm, and the average diameter $D3$ is 0.10 μm or more and less than 2.00 μm.

4. The separation membrane according to claim 1, wherein the average diameter $D3$ and the average diameter $D2$ satisfy a relational expression of $-0.30$ μm $< (D3-D2) < 0.30$ μm.

5. The separation membrane according to claim 2, wherein the average diameter $D3$ and the average diameter $D2$ satisfy a relational expression of $-0.30$ μm $< (D3-D2) < 0.30$ μm.

6. The separation membrane according to claim 1, wherein the average diameter $D1$ and the average diameter $D3$ satisfy a relational expression of $1.32 < D1/D3 < 3.24$.

* * * * *